United States Patent

Kinoshita et al.

[11] Patent Number: 6,063,740
[45] Date of Patent: May 16, 2000

[54] GREASE COMPOSITION FOR ROLLING BEARINGS

[75] Inventors: Hirotugu Kinoshita; Kiyomi Sakamoto, both of Yokohama, Japan

[73] Assignee: Nippon Oil Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/173,048

[22] Filed: Oct. 15, 1998

[30] Foreign Application Priority Data

Oct. 21, 1997 [JP] Japan .................................. 9-288385

[51] Int. Cl.⁷ .............................................. C10M 135/18
[52] U.S. Cl. ......................... 508/364; 508/444; 508/552
[58] Field of Search .................... 508/363, 364, 508/444, 552

[56] References Cited

U.S. PATENT DOCUMENTS

| | | | |
|---|---|---|---|
| 3,244,627 | 4/1966 | Smith et al. | 508/363 |
| 3,876,550 | 4/1975 | Holubec | 508/444 |
| 4,648,985 | 3/1987 | Thorsell et al. | 508/364 |
| 4,842,753 | 6/1989 | Mori et al. | 508/363 |
| 4,859,352 | 8/1989 | Waynick | 508/444 |
| 4,880,551 | 11/1989 | Doe | 508/444 |
| 5,512,188 | 4/1996 | Kinoshita et al. | 508/155 |

*Primary Examiner*—Jacqueline V. Howard
*Assistant Examiner*—Cephia Toomer
*Attorney, Agent, or Firm*—Darby & Darby

[57] ABSTRACT

A grease composition for rolling bearing containing a thiocarbamate derivative represented by the formula (1):

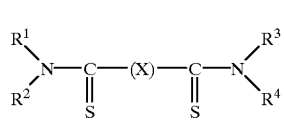

(1)

wherein $R^1$, $R^2$, $R^3$ and $R^4$ are the same or different groups and denote a hydrocarbon group having 1 to 18 carbon atoms, and X denotes S—Cu—S, S—Ni—S, S, S—S, S—S—S—S, S—CH$_2$—S, S—(CH$_2$)$_2$—S or S—(CH$_2$)$_3$—S, in an amount of 0.05 to 10 mass % with respect to the total amount of the composition. The present grease composition exhibits a long flaking life.

11 Claims, No Drawings

GREASE COMPOSITION FOR ROLLING BEARINGS

BACKGROUND OF THE INVENTION

The present invention relates to a grease composition for rolling bearings, in particular to a grease composition applied to rolling bearings in electrical components and accessory devices for automotive vehicles, such as alternators, electromagnetic clutches for car air conditioners, idle pulleys, electric fan motors, or the like.

In automotive vehicles, engine compartment space has necessarily been reduced for adapting to the prevailing FF cars aiming at reduction in size and weight of the vehicles, and with the demand for increasing cabin space. Accordingly, the size and weight of the electrical components and accessories such as alternators, electromagnetic clutches for car air conditioners, idle pulleys, or electric fan motors have further been reduced. At the same time, the electrical components and accessories are demanded to achieve higher performance and higher output power. Therefore, in an alternator, for example, reduction in output power caused by size reduction is compensated by increasing the designed speed. Further, to keep up with the demand for quiet operation, the degree of sealing of the engine compartment is advanced and hence the engine compartment tend to be heated, so that components capable of withstanding higher temperatures are required.

In these electrical components and accessories, rolling bearings are used, which are lubricated mainly with grease.

However, there has been reported that, as the rotational speed of the bearings and the load applied to the bearings are increased due to the sever operational conditions, the service life of the rolling bearings tends to be terminated at an earlier stage of use because of flaking of the race way of the bearings.

For solving such a problem, Japanese Laid-open Patent Application Nos. 1-259097, 3-28299 and 6-17079 propose grease compositions which employ alkyldiphenyl ether base oil and a urea thickener. However, none of these grease compositions can exhibit a sufficiently extended flaking life.

SUMMARY OF THE INVENTION

The object of the present invention is to provide a grease composition for rolling bearings exhibiting an extended flaking life.

According to the present invention, there is provided a grease composition for rolling bearing comprising a thiocarbamate derivative represented by the formula (1):

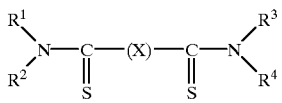

(1)

wherein $R^1$, $R^2$, $R^3$ and $R^4$ are the same or different groups and denote a hydrocarbon group having 1 to 18 carbon atoms, and X denotes S—Cu—S, S—Ni—S, S, S—S, S—S—S—S, S—CH$_2$—S, S—(CH$_2$)$_2$—S or S—(CH$_2$)$_3$—S, in an amount of 0.05 to 10 mass % with respect to the total amount of the composition.

PREFERRED EMBODIMENT OF THE INVENTION

The grease composition of the present invention is characterized in containing a specific thiocarbamate derivative, which will be explained hereinbelow. The thiocarbamate derivative is represented by the formula (1) presented above.

In the formula (1), X denotes S—Cu—S, S—Ni—S, S, S—S, S—S—S—S, S—CH$_2$—S, S—(CH$_2$)$_2$—S or S—(CH$_2$)$_3$—S. $R^1$, $R^2$, $R^3$ and $R^4$ may be the same or different and denote a hydrocarbon group having 1 to 18, preferably 1 to 13, and more preferably 3 to 8 carbon atoms. The hydrocarbon group may include an alkyl group, an alkenyl group, an aryl group, an alkylaryl group and an arylalkyl group. The alkyl group is preferable for preventing flaking at the early stage of use. The hydrocarbon group for $R^1$, $R^2$, $R^3$ and $R^4$ may include an alkyl group having 1 to 18 carbon atoms such as a methyl group, an ethyl group, a n-propyl group, an isopropyl group, a n-butyl group, an isobutyl group, a sec-butyl group, a tert-butyl group, a straight or branched pentyl group, a straight or branched hexyl group, a straight or branched heptyl group, a straight or branched octyl group, a straight or branched nonyl group, a straight or branched decyl group, a straight or branched undecyl group, a straight or branched dodecyl group, a straight or branched tridecyl group, a straight or branched tetradecyl group, a straight or branched pentadecyl group, a straight or branched hexadecyl group, a straight or branched heptadecyl group, and a straight or branched octadecyl group; an alkenyl group having 4 to 18 carbon atoms such as straight or branched butenyl group, a straight or branched pentenyl group, a straight or branched hexenyl group, a straight or branched heptenyl group, a straight or branched octenyl group, a straight or branched nonenyl group, a straight or branched decenyl group, a straight or branched undecenyl group, a straight or branched dodecenyl group, a straight or branched tridecenyl group, a straight or branched tetradecenyl group, a straight or branched pentadecenyl group, a straight or branched hexadecenyl group, a straight or branched heptadecenyl group, and a straight or branched octadecenyl group; a cycloalkyl group having 5 to 7 carbon atoms such as a cyclopentyl group, a cyclohexyl group and a cycloheptyl group; an alkylcycloalkyl group having 6 to 11 carbon atoms such as a methylcyclopentyl group, a dimethylcyclopentyl group (including all of structural isomers), a methylethylcyclopentyl group (including all of structural isomers), a diethylcyclopentyl group (including all of structural isomers), a methylcyclohexyl group, a dimethylcyclohexyl group (including all of structural isomers), a methylethylcyclohexyl group (including all of structural isomers), a diethylcyclohexyl group (including all of structural isomers), a methylcycloheptyl group, a dimethylcycloheptyl group (including all of structural isomers), a methylethylcycloheptyl group (including all of structural isomers) and a diethylcycloheptyl group (including all of structural isomers); an aryl group such as a phenyl group and a naphthyl group; an alkylaryl group having 7 to 18 carbon atoms such as a tolyl group (including all of structural isomers), a xylyl group (including all of structural isomers), an ethylphenyl group (including all of structural isomers), a straight or branched propylphenyl group (including all of structural isomers), a straight or branched butylphenyl group (including all of structural isomers), a straight or branched pentylphenyl group (including all of structural isomers), a straight or branched hexylphenyl group (including all of structural isomers), a straight or branched heptylphenyl group (including all of structural isomers), a straight or branched octylphenyl group (including all of structural isomers), a straight or branched nonylphenyl group (including all of structural isomers), a straight or branched decylphenyl group (including all of structural isomers), a straight or branched undecylphenyl group (including all of structural isomers) and a straight or branched dodecylphenyl group (including all of structural isomers); an arylalkyl group having 7 to 12 carbon atoms such as a benzyl group, a phenylethyl group, a phenylpropyl group (including isomers at the propyl group), a phenylbutyl group (including isomers at the butyl group), a phenylpentyl group (including isomers at the pentyl group), and a phenylhexyl group (including isomers at the hexyl group).

The thiocarbamate derivative represented by the formula (1) may specifically include copper dimethyldithiocarbamate, copper diethyldithiocarbamate, copper dipropyldithiocarbamate, copper dibutyldithiocarbamate, copper dipentyldithiocarbamate, copper dihexyldithiocarbamate, copper diheptyldithiocarbamate, copper dioctyldithiocarbamate, copper dinonyldithiocarbamate, copper didecyldithiocarbamate, copper diundecyldithiocarbamate, copper didodecyldithiocarbamate, copper ditridecyldithiocarbamate, nickel dimethyldithiocarbamate, nickel diethyldithiocarbamate, nickel dipropyldithiocarbamate, nickel dibutyldithiocarbamate, nickel dipentyldithiocarbamate, nickel dihexyldithiocarbamate, nickel diheptyldithiocarbamate, nickel dioctyldithiocarbamate, nickel dinonyldithiocarbamate, nickel didecyldithiocarbamate, nickel diundecyldithiocarbamate, nickel didodecyldithiocarbamate, nickel ditridecyldithiocarbamate, methylene bis(dibutyldithiocarbamate), bis(dimethylthiocarbamyl)monosulfide, bis(dimethylthiocarbamyl)disulfide, bis(diethylthiocarbamyl) disulfide, bis(dibutylthiocarbamyl)disulfide, bis(dipentylthiocarbamyl)disulfide, bis(dioctylcarbamyl) disulfide, and mixtures thereof.

The content of the thiocarbamate derivative with respect to the total amount of the composition is not less than 0.05 mass % and preferably not less than 0.25 mass %; and not more than 10 mass % and preferably not more than 5 mass %. If the content is 0.05 mass % or more, sufficient anti-flaking effect for extending flaking life may be obtained. Adding more than 10 mass % of the thiocarbamate derivative does not result in further improvement of anti-flaking effect. Usually, the thiocarbamate derivative is commercially available in a form of a dilution in a mineral oil or kerosene. When such a commercially available dilution is used, the mixing ratio of the thiocarbamate derivative is decided based on the net content of the thiocarbamate derivative in the dilution.

The grease composition of the present invention may further contain a base oil. The base oil may include a mineral oil and/or a synthetic oil.

The mineral oil may be those obtained by conventional method for producing lubricating oils in the field of petroleum refining. For example, the mineral oil may be prepared by distilling crude oil under atmospheric or reduced pressure to obtain lubricant fractions, and purifying the fractions by at least one of the treatments including solvent deasphalting, solvent extraction, hydrocracking, solvent dewaxing, contact dewaxing, hydrofining, washing with sulfuric acid, and clay purification.

The synthetic oil may be a poly α-olefin such as polybutene, 1-octene oligomer, or 1-decene oligomer, or a hydride of such poly α-olefins; a diester such as ditridecyl glutarate, di-2-ethylhexyl adipate, diisodecyl adipate, ditridecyl adipate, or di-3-ethylhexyl sebacate; a polyol ester such as trimethylolpropane caprylate, trimethylolpropane pelargonate, pentaerythritol-2-ethyl hexanoate, or pentaerythritol pelargonate; alkylnaphthalene; alkylbenzene and polyoxyalkylene glycol; polyphenyl ether, alkyldiphenyl ether; or mixtures thereof.

As the base oil for the present composition, the synthetic oils are preferred for its thermostability. Among the synthetic oils, hydrides of poly α-olefins, polyol esters, alkyldiphenyl ethers and mixtures thereof are particularly preferred for their excellent thermostability.

The hydrides of poly α-olefins may preferably be compounds represented by the formula (2):

wherein $R^5$ denotes a straight or branched alkyl group having 6 to 10 carbon atoms such as a hexyl group, a heptyl group, an octyl group, a nonyl group, or a decyl group, and n is a number of 3 to 8.

The polyol esters may preferably be trimethylolpropane esters represented by the formula (3) or pentaerythritol esters represented by the formula (4):

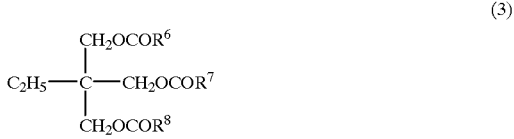

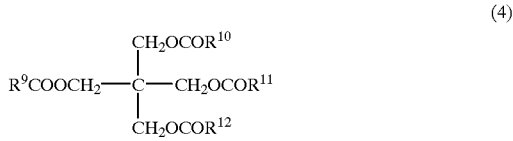

wherein $R^6$ to $R^{12}$ may be the same or different groups, and each denotes a straight or branched alkyl group having 4 to 16 and preferably 6 to 14 carbon atoms such as a butyl group, a pentyl group, a hexyl group, a heptyl group, an octyl group, a nonyl group, a decyl group, an undecyl group, a dodecyl group, a tridecyl group, a tetradecyl group, a pentadecyl group, or a hexadecyl group.

The alkyldiphenyl ethers may preferably be compounds represented by the formula (5):

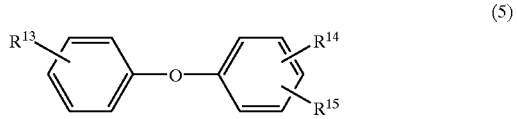

wherein $R^{13}$, $R^{14}$ and $R^{15}$ may be the same or different groups, and denote a hydrogen atom or an alkyl group having 8 to 22 carbon a toms. At least one of $R^{13}$, $R^{14}$ and $R^{15}$ is an alkyl group. Particularly preferred is a dialkyldiphenyl ether in which two of $R^{13}$, $R^{14}$ and $R^{15}$ are the alkyl groups. The alkyl groups may be those having 8 to 22, preferably 10 to 16, and more preferably 12 to 14 carbon atoms, such as an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, a heneicosyl group, and a docosyl group.

The method for producing the alkyldiphenyl ether is not particularly limited. For example, the alkyldiphenyl ether may be produced by adding one or more moles, preferably 1 to 3 moles, and more preferably 2 moles of α-olefin having 8 to 22, preferably 10 to 16 and more preferably 12 to 14 carbon atoms, to one mole of diphenyl ether.

The kinetic viscosity of the base oil is not particularly limited, and may be 20 to 300 mm$^2$/s, preferably 40 to 200 mm$^2$/s, and more preferably 60 to 150 mm$^2$/s at 40° C.

The present grease composition may further contain a thickener. The thickener may be selected from a variety of thickeners, for example, soap thickeners such as a metal soap and a complex metal soap; and non-soap thickeners such as bentone, silica gel, urea compounds, urea-urethane compounds, and urethane compounds. Among these, urea compounds, urea-urethane compounds, urethane compounds, and mixtures thereof are particularly preferred in view of their heat resistance.

Examples of the soap thickener may include sodium soap, calcium soap, aluminum soap and lithium soap.

Examples of the urea compounds, urea-urethane compounds and urethane compounds may include diurea compounds, triurea compounds, tetraurea compounds, polyurea compounds other than diurea, triurea and tetraurea compounds, urea-urethane compounds, diurethane compounds and mixtures thereof. Among these compounds, the diurea compounds, the urea-urethane compounds, the diurethane compounds and mixture thereof are particularly preferred.

More specifically, a compound or a mixture of compounds represented by the formula (6) is preferred:

$$A\text{---CONH---}R^{16}\text{---NHCO---}B \quad (6)$$

wherein $R^{16}$ denotes a divalent hydrocarbon group, and A and B may be the same or different groups and denote —NHR$^{17}$, —NHR$^{18}$R$^{19}$ or —OR$^{20}$; wherein R$^{17}$, R$^{18}$, R$^{19}$ and R$^{20}$ may be the same or different groups and denote a hydrocarbon residue having 6 to 20 carbon atoms.

$R^{16}$ in the formula (6) may be a divalent hydrocarbon group having preferably 6 to 20, and more preferably 6 to 15 carbon atoms. The divalent hydrocarbon group may be a straight or branched alkylene group, a straight or branched alkenylene group, a cycloalkylene group or an aromatic group. Specific examples of $R^{16}$ may include an ethylene group, a 2,2-dimethyl-4-methylhexylene group, and groups represented by the following formulae:

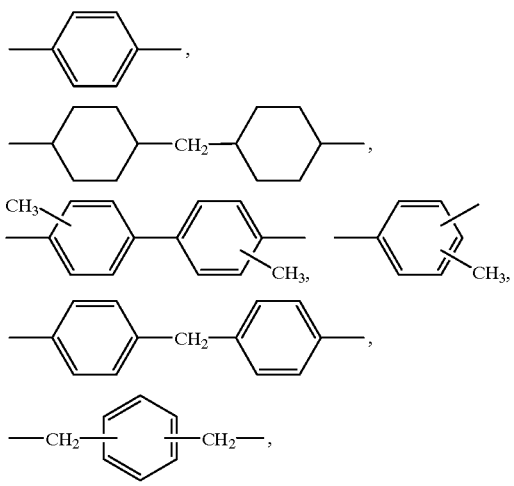

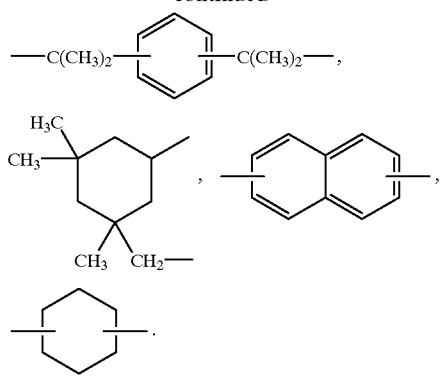

Among these, the following groups are particularly preferred.

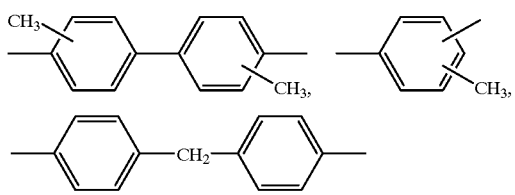

R$^{17}$, R$^{18}$, R$^{19}$ and R$^{20}$ may be a straight or branched alkyl group, a straight or branched alkenyl group, a cycloalkyl group, an alkylcycloalkyl group, an aryl group, an alkylaryl group, or an arylalkyl group. Specifically, they may be a straight or branched alkyl group such as a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an eicosyl group; a straight or branched alkenyl group such as a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group and an eicosenyl group; a cyclohexyl group; an alkylcycloalkyl group such as a methylcyclohexyl group, a dimethylcyclohexyl group, an ethylcyclohexyl group, a diethylcyclohexyl group, a propylcyclohexyl group, an isopropylcyclohexyl group, 1-methyl-3-propylcyclohexyl group, a butylcyclohexyl group, a butylmethylcyclohexyl group, a hexylcyclohexyl group, a heptylcyclohexyl group, an octylcyclohexyl group, a nonylcyclohexyl group, a decylcyclohexyl group, an undecylcyclohexyl group, a dodecylcyclohexyl group, a tridecylcyclohexyl group and a tetradecylcyclohexyl group; an aryl group such as a phenyl group and a naphthyl group; an alkylaryl group such as a toluyl group, an ethylphenyl group, a xylyl group, a propylphenyl group, a cumenyl group, a methylnaphthyl group, an ethylnaphthyl group, a dimethylnaphthyl group and a propylnaphthyl group; an arylalkyl group such as a benzyl group, a methylbenzyl group and an ethylbenzyl group. Among these, a cyclohexyl group, an octadecyl group or toluyl group are partucularly preferred.

These diurea compounds, urea-urethane compounds or diurethane compounds may be prepared by reacting a diisocyanate represented by the formula OCN—R$^{16}$—NCO and a compound represented by the formula R$^{17}$NH$_2$, R$^{18}$R$^{19}$NH or R$^{20}$OH or mixtures thereof, in the base oil at 10 to 200°

C. $R^{16}$, $R^{17}$, $R^{18}$ $R^{19}$ and $R^{20}$ used herein are the same as $R^{16}$, $R^{17}$, $R^{18}$, $R^{19}$ and $R^{20}$ in the formula (6) above.

In the present invention, among the compounds represented by the formula (6), those of which A and B are —$NHR^{17}$ are particularly preferred. More preferred are compounds of which $R^{17}$ is a cyclohexyl group, a cyclohexyl derivative group having 7 to 12 carbon atoms, or an alkyl group having 8 to 20 carbon atoms. The compounds represented by the formula (6) are employed most preferably as a mixture wherein the percentage of the cyclohexyl groups and derivatives thereof to all of $R^{17}$, i.e., [{the number of cyclohexyl groups and derivatives thereof}/(the number of cyclohexyl groups and derivatives thereof+the number of alkyl groups)]×100], is 50 to 100%, preferably 70 to 100%. When the content of the cyclohexyl groups and derivatives thereof is not less than 50%, the grease composition will exhibit good shear stability, and therefore hardly leak from bearing and exhibit long grease life.

$R^{17}$ at two ends of one compound may be the same or different. Examples of the combinations of the groups at the two ends may specifically include cyclohexyl group-cyclohexyl group, cyclohexyl group-tetradecyl group, cyclohexyl group-hexadecyl group, cyclohexyl group-octadecyl group, tetradecyl group-tetradecyl group, tetradecyl group-hexadecyl group, tetradecyl group-octadecyl group, hexadecyl group-hexadecyl group, hexadecyl group-octadecyl group, and octadecyl group-octadecyl group.

If the present grease composition contains the thickener, the desirable content thereof may be not less than 2 mass % and preferably not less than 3 mass %; and not more than 30 mass% and preferably not more than 20 mass %, with respect to the total amount of the grease composition.

If necessary, the present grease composition may further contain a publicly known additives for further improving the performance thereof. As the additive, antioxidants such as amine antioxidants, phenol antioxidants and sulfur antioxidants; extreme pressure agents such as chlorine-, sulfur- or phosphorus-containing agents, and zinc dithiophosphate and organic molybdenum compounds; oilness agents such as fatty acids and oils from animals and vegetables; rust-inhibitors such as petroleum sulfonate, dinonylnaphthalene sulfonate and solbitan ester; metal disactivators such as benzotriazol, benzothiaziazole and sodium nitrite; and viscosity index improvers such as polymethacrylate, polyisobutylene and polystyrene. These additives maybe used solely or as a mixture. The added amount of these additives may preferably be not more than 20 mass % with respect to the total amount of the composition.

Method for preparing the present grease composition is not particularly limited. Usually, the objective grease composition may be prepared by adding the thiocarbamate derivative to abase composition containing the base oil and other ingredients and stirring, and, if necessary, passing the mixture through a roll mill.

The grease composition of the present invention may be used for a roll bearing, particularly a roll bearing in electrical components for automotive vehicles. Preferably, the grease composition of the present invention may be used for bearings in electrical components and accessory devices for automotive vehicles, such as alternators, electromagnetic clutches for car air conditioners, tension pulleys, idle pulleys, electric fan motors, or the like.

Since the grease composition of the present invention contains the specific amount of the specific thiocarbamate derivative, it exhibits an extended flaking life when used in rolling bearings. Therefore, the grease composition of the present invention is useful for bearings in electrical components and accessory devices for automotive vehicles, such as alternators, electromagnetic clutches for car air conditioners, tension pulleys, idle pulleys, electric fan motors, or the like.

EXAMPLES OF THE INVENTION

The present invention will be explained in more detail with reference to Examples and Comparative Examples. However, the present invention is not limited thereto.

The base oils used and the tests performed in the Examples and the Comparative Examples are described below.

(Oils Used)
1. Dialkyldiphenyl Ether (DADPE)

Dialkyldiphenyl ether represented by the following formula having the kinetic viscosity of 100 mm²/s at 40° C.:

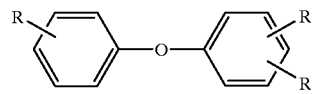

wherein Rs are the same or different groups, and one of them is a hydrogen atom, and the other two are alkyl groups having 12 to 14 carbon atoms.

2. PAO

A mixture of hydrides of 1-decene oligomers represented by the following formula having kinetic viscosity of 50 mm²/s at 40° C.:

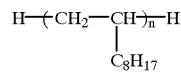

wherein n is a number of 3 to 5.

(Quick Acceleration-Deceleration Test)

1.6 g of each grease was charged in double row deep groove ball bearings with the inner diameter of 30 mm, the outer diameter of 52 mm, and the width of 22 mm, fitted with a contact rubber seal. The bearings were run into continuous rotation at pulley load of 200 kgf, repeating quick acceleration from the rotational speed of the bearing outer ring of 4000 rpm to 12000 rpm, and quick deceleration from 12000 rpm to 4000 rpm. Duration of the operation until the bearings started to shake due to flaking of the race way of the bearing inner ring was measured.

(High Temperature-High Speed Seizure Test)

1.4 g of each grease was charged in double row deep groove ball bearings with the inner diameter of 30 mm, the outer diameter of 52 mm, and the width of 22 mm, fitted with a contact rubber seal. The bearings were run into continuous rotation at a bearing outer ring rotational speed of 9000 rpm at 160° C. at the bearing load of 141 kgf. Duration of the operation until the bearings were seized up was measured.

Examples 1 to 3

Diphenylmethane-4,4'-diisocyanate was dissolved in PAO as a base oil under heating. To this mixture, cyclohexylamine dissolved in the same base oil under heating was added, to prepare gels. To the gels thus obtained, each of the thiocarbamate derivatives shown in Table 1 was added. The mixture was stirred and passed througha roll mill, to obtain each grease composition. These grease compositions thus obtained were subjected to the quick acceleration-deceleration test and high temperature-high speed seizure test. The results are shown in Table 1. It is recognized that all of the grease compositions of Examples 1 to 3 exhibited excellent results in both the quick acceleration-deceleration test and high temperature-high speed seizure test, and thus have an extended flaking life.

Comparative Example 1

A grease composition was prepared in the same way as that of Examples 1 to 3 except that the thiocarbamate derivative was not added. The grease composition thus obtained was subjected to the quick acceleration-deceleration test and high temperature-high speed seizure test. The results are shown in Table 1. It is recognized that the results of both the quick acceleration-deceleration test and high temperature-high speed seizure test for the composition of Comparative Example 1 were inferior to those of Examples 1 to 3.

Comparative Example 2

A grease composition containing dialkyldiphenyl ether (DADPE) as abase oil and a urea thickener, which has been studied as a grease composition for preventing flaking at an early stage of use, was prepared. The components of this composition are shown in Table 1. The grease composition was subjected to the quick acceleration-deceleration test and high temperature-high speed seizure test. The results are shown in Table 1. It is recognized that the results of both the quick acceleration-deceleration test and high temperature-high speed seizure test for the composition of Comparative Example 2 were inferior to those of Examples 1 to 3.

TABLE 1

|  |  | Examples | | | Comp. Examples | |
|---|---|---|---|---|---|---|
|  |  | 1 | 2 | 3 | 1 | 2 |
| Thickener (g) | diphenylmethane-4,4'-diisocyanate | 111.6 | 111.6 | 111.6 | 111.6 | 111.6 |
|  | cyclohexylamine | 88.4 | 88.4 | 88.4 | 88.4 | 88.4 |
| Base Oil (g) | DADPE | — | — | — | — | 740 |
|  | PAO | 710 | 690 | 720 | 740 | — |
| Thio-carbamate Deriva-tive | copper dipentyl dithiocarbamate*1 | 30.0 (1.5) | — | — | — | — |
|  | nickel dibutyl dithiocarbamate*1 | — | 50.0 (2.5) | — | — | — |
|  | bis (diethylthio-carbamyl) disulfide*1 | — | — | 20.0 (1.0) | — | — |
| Other Additives | Anti-oxidant | 30.0 | 30.0 | 30.0 | 30.0 | 30.0 |
|  | Rust-inhibitor | 30.0 | 30.0 | 30.0 | 30.0 | 30.0 |
| Test Results | Mixture Consistency | 251 | 245 | 263 | 268 | 257 |
|  | Quick Acceleration-Deceleration Test (hr.) | 1400 | 1280 | 1160 | 250 | 740 |
|  | High Temperature-High Speed Seizure Test (hr.) | 1470 | 1320 | 1290 | 510 | 930 |

*1; Net content 50 mass %
Numbers in parentheses; mass % of the thiocarbamate derivative with respect to the total amount of the grease composition

What is claimed is:

1. A grease composition for rolling bearing comprising a base oil selected from the group consisting of a hydride of a poly α-olefin, a polyol ester, an alkyldiphenyl ether and mixtures thereof, a thickener selected from the group consisting of a urea compound, a urea-urethane compound, a urethane compound and mixtures thereof and a thiocarbamate derivative represented by the formula (1):

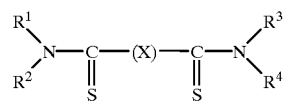

(1)

wherein $R^1$, $R^2$, $R^3$ and $R^4$ are the same or different groups and denote a hydrocarbon group having 1 to 18 carbon atoms, and X denotes S—Cu—S, S—Ni—S, S, S—S, S—S—S—S, S—CH$_2$—S, S—(CH$_2$)$_2$—S or S—(CH$_2$)$_3$—S, wherein the amounts of said thickener and said thiocarbamate derivative are 2 to 30 mass % and 0.05 to 10 mass %, respectively, with respect to the total amount of said grease composition.

2. The grease composition of claim 1 wherein said hydrocarbon group is selected from the group consisting of an alkyl group, an alkenyl group, an aryl group, an alkylaryl group and an arylalkyl group.

3. The grease composition of claim 2 wherein said hydrocarbon group is an alkyl group.

4. The grease composition of claim 1 wherein said thiocarbamate derivative is selected from the group consisting of copper dimethyldithiocarbamate, copper diethyldithiocarbamate, copper dipropyldithiocarbamate, copper dibutyldithiocarbamate, copper dipentyldithiocarbamate, copper dihexyldithiocarbamate, copper diheptyldithiocarbamate, copper dioctyldithiocarbamate, copper dinonyldithiocarbamate, copper didecyldithiocarbamate, copper diundecyldithiocarbamate, copper didodecyldithiocarbamate, copper ditridecyldithiocarbamate, nickel dimethyldithiocarbamate, nickel diethyldithiocarbamate, nickel dipropyldithiocarbamate, nickel dibutyldithiocarbamate, nickel dipentyldithiocarbamate, nickel dihexyldithiocarbamate, nickel diheptyldithiocarbamate, nickel dioctyldithiocarbamate, nickel dinonyldithiocarbamate, nickel didecyldithiocarbamate, nickel diundecyldithiocarbamate, nickel didodecyldithiocarbamate, nickel ditridecyldithiocarbamate, methylene bis(dibutyldithiocarbamate), bis (dimethylthiocarbamyl)monosulfide, bis (dimethylthiocarbamyl)disulfide, bis(diethylthiocarbamyl) disulfide, bis(dibutylthiocarbamyl)disulfide, bis (dipentylthiocarbamyl)disulfide, bis(dioctylcarbamyl) disulfide, and mixtures thereof.

5. The grease composition of claim 1 wherein the content of said thiocarbamate derivative is 0.25 to 5 mass % with respect to the total amount of said composition.

6. The grease composition of claim 1 wherein said hydride of a poly α-olefin has the structure represented by the formula (2):

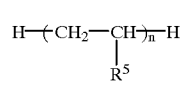

(2)

wherein $R^5$ denotes a straight or branched alkyl group having 6 to 10 carbon atoms, and n denotes a number of 3 to 8.

7. The grease composition of claim 1 wherein said polyol ester is selected from the group consisting of a compound represented by the formula (3), a compound represented by the formula (4) and mixtures thereof:

(3)

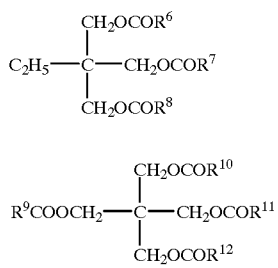

(4)

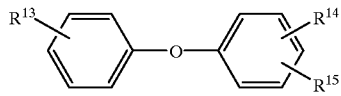

wherein $R^6$ to $R^{12}$ are the same or different groups, and denote a straight or branched alkyl group having 4 to 16 carbon atoms.

8. The grease composition of claim 1 wherein said alkyldiphenyl ether has the structure represented by the formula (5):

(5)

wherein $R^{13}$, $R^{14}$ and $R^{15}$ are the same or different groups and denote a hydrogen atom or an alkyl group having 8 to 22 carbon atoms, with the proviso that at least one of $R^{13}$, $R^{14}$ and $R^{15}$ is an alkyl group.

9. The grease composition of claim 1 wherein said base oil has a kinetic viscosity of 20 to 300 mm²/s at 40° C.

10. The grease composition of claim 1 wherein said thickener is one or more sorts of compounds having the structure represented by the formula (6):

$$A-CONH-R^{16}-NHCO-B \quad (6)$$

wherein $R^{16}$ denotes a divalent hydrocarbon group, and A and B are the same or different groups and denote —$NHR^{17}$, —$NHR^{18}R^{19}$ or —$OR^{20}$; wherein $R^{17}$, $R^{18}$, $R^{19}$ and $R^{20}$ are the same or different groups and denote a hydrocarbon residue having 6 to 20 carbon atoms.

11. The grease composition of claim 1 further comprising an additive selected from the group consisting of antioxidant, an extreme pressure agent, an oilness agent, a rust-inhibitor, a metal disactivator, a viscosity index improver, and mixtures thereof.

* * * * *

UNITED STATES PATENT AND TRADEMARK OFFICE
CERTIFICATE OF CORRECTION

PATENT NO. : 6,063,740  
DATED : May 16, 2000  
INVENTOR(S) : Hirotugu Kinoshita and Kiyomo Sakamoto Page 1 of 1

It is certified that error appears in the above-identified patent and that said Letters Patent is hereby corrected as shown below:

<u>Title page,</u>
Item [75] Inventor, change "Yokohama, Japan" to -- Kanagawa-Ken, Japan --.

Signed and Sealed this

Thirteenth Day of November, 2001

Attest:

*Attesting Officer*

NICHOLAS P. GODICI  
*Acting Director of the United States Patent and Trademark Office*